(12) United States Patent
Varillas et al.

(10) Patent No.: US 9,194,303 B2
(45) Date of Patent: Nov. 24, 2015

(54) LOAD REJECTION FOR GAS TURBINE

(76) Inventors: Gerardo F. Varillas, Greenville, SC (US); Skigh Elliot Lewis, Simpsonville, SC (US); Erhan Karaca, Ballston Lake, NY (US); Alejandro Cesar Lopez, Greenville, SC (US)

( * ) Notice: Subject to any disclaimer, the term of this patent is extended or adjusted under 35 U.S.C. 154(b) by 470 days.

(21) Appl. No.: 13/588,921

(22) Filed: Aug. 17, 2012

(65) Prior Publication Data

US 2014/0047815 A1    Feb. 20, 2014

(51) Int. Cl.
| | |
|---|---|
| *F02C 9/28* | (2006.01) |
| *F23R 3/28* | (2006.01) |
| *F02C 7/22* | (2006.01) |
| *F02C 7/232* | (2006.01) |
| *F02C 9/32* | (2006.01) |

(52) U.S. Cl.
CPC ... *F02C 9/28* (2013.01); *F02C 7/22* (2013.01); *F02C 7/232* (2013.01); *F02C 9/32* (2013.01); *F23R 3/28* (2013.01); *F05D 2270/31* (2013.01)

(58) Field of Classification Search
CPC .............. F02C 7/22; F02C 9/26; F02C 9/263; F02C 9/28; F02C 9/32; F05D 2270/31; F23N 2029/00; F23N 2041/20
See application file for complete search history.

(56) References Cited

U.S. PATENT DOCUMENTS

| | | |
|---|---|---|
| 5,896,736 A | 4/1999 | Rajamani |
| 2008/0071427 A1* | 3/2008 | Szepek et al. .................. 700/287 |
| 2009/0158702 A1 | 6/2009 | Tonno et al. |

\* cited by examiner

*Primary Examiner* — Phutthiwat Wongwian
*Assistant Examiner* — Marc Amar
(74) *Attorney, Agent, or Firm* — Fletcher Yoder, P.C.

(57) ABSTRACT

A gas turbine system includes a compressor, a fuel source, a combustor, and a turbine. The compressor is configured to compress air. The fuel source is configured to supply fuel to a plurality of fuel manifolds. The combustor is configured to receive the air from the compressor, to receive the fuel from the plurality of fuel manifolds, and to combust the air and the fuel into combustion products. The turbine is configured to extract work from the combustion products. A fuel control valve is disposed within each of the plurality of fuel manifolds and is configured to throttle the fuel to the combustor when the gas turbine system is operating in an electrical island mode.

20 Claims, 6 Drawing Sheets ized and more of the elements.

LOAD REJECTION FOR GAS TURBINE

BACKGROUND

The subject matter disclosed herein relates to gas turbine systems, and more specifically, to systems and methods to enable load rejection for the gas turbine systems.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, such as an electrical generator. The electrical generator may generate electrical power for a variety of downstream users, such as air conditioning systems, electric motors, power grids, and the like. In general, the gas turbine engine is designed for a normal or rated load (e.g., electrical demand) of the downstream users. However, the electrical demand of the downstream users may be unpredictable. For example, the power demand of power grid may suddenly decrease, or the power grid may be disconnected from the electrical generator. Unfortunately, the gas turbine engine may be unresponsive to the step change in power demand, resulting in an inefficient operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gas turbine system includes a compressor, a fuel source, a combustor, and a turbine. The compressor is configured to compress air. The fuel source is configured to supply fuel to a plurality of fuel manifolds. The combustor is configured to receive the air from the compressor, to receive the fuel from the plurality of fuel manifolds, and to combust the air and the fuel into combustion products. The turbine is configured to extract work from the combustion products. A fuel control valve is disposed within each of the plurality of fuel manifolds and is configured to throttle the fuel to the combustor when the gas turbine system is operating in an electrical island mode.

In a second embodiment, a system includes a gas turbine engine and a controller. The gas turbine engine has a combustor configured to combust a mixture of fuel and air. The controller is configured to select an operating fuel schedule from a plurality of fuel schedules and to adjust the fuel and air mixture to the combustor based on the operating fuel schedule.

In a third embodiment, an article of manufacture includes one or more tangible, machine-readable media at least collectively having instructions executable by a processor. The instructions include instructions to receive a signal to initiate load rejection by a gas turbine generator, detect an ambient condition of the gas turbine engine and a power demand of a local load supplied at least partially by the gas turbine engine, and to select a fuel schedule based on the signal. In addition, the instructions include instructions to select an operating mode of the fuel schedule based on the ambient temperature and the power demand and to throttle a fuel flow to the gas turbine engine based on the operating mode of the fuel schedule.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

The present disclosure is directed towards systems and methods to enable load rejection for gas turbine engines in electrical island operation (e.g., disconnected from the electrical grid). In particular, this disclosure teaches throttling the fuel, not merely the air alone—to the gas turbine engine to reduce the amount of electrical power generated, thereby rejecting a portion of the normal load. In order to maintain the combustion flame within the gas turbine engine and/or reduce the likelihood of overtemperature, it is desirable to throttle the fuel to the gas turbine engine in a controlled manner. Accordingly, a predetermined fuel schedule may determine the amount of fuel directed to the gas turbine engine. In certain embodiments, the fuel schedule may be based on an ambient condition, such as temperature, and a desired power output of the gas turbine engine.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements.

The terms "comprising," "including," and "having" are intended to be inclusive and mean that there may be additional elements other than the listed elements.

Figure 1:
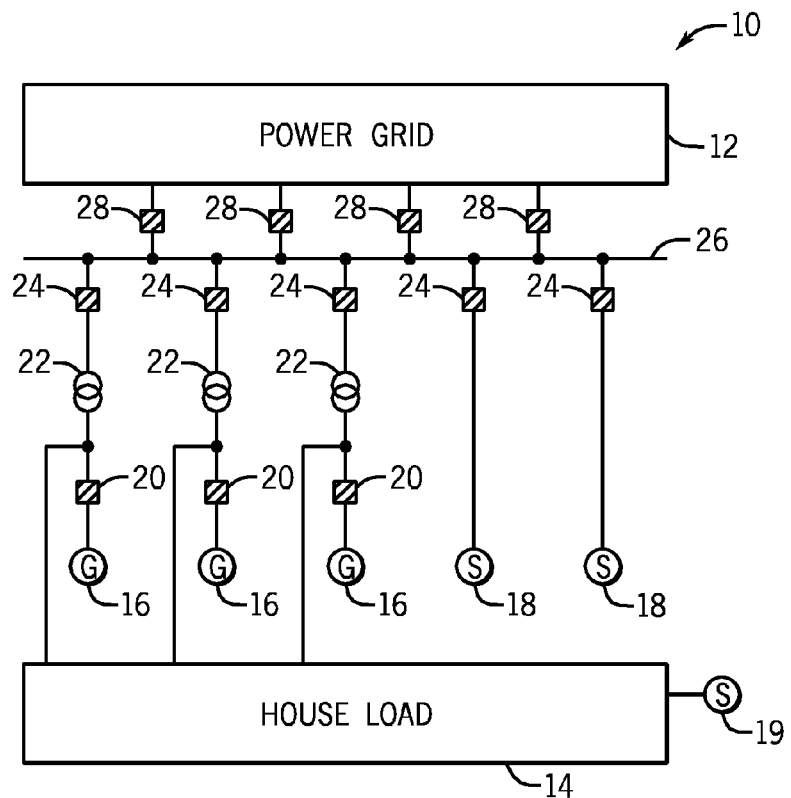
FIG. 1 is a schematic diagram of an electrical system including gas turbine engines and steam turbines to produce power for a power grid and a house load, in accordance with an embodiment.

Turning now to the figures, FIG. 1 illustrates an electrical system 10 that may selectively supply electrical power to a power grid 12 and/or a house load 14. In certain embodiments, the house load 14 may power various systems within an industrial facility, such as air conditioning systems, electric motors, and the like. Depending on the size and scope of the industrial facility, a power demand of the house load 14 may be in excess of 100 megawatts (MW). As illustrated, electrical power may be generated by one or more gas turbines 16 and one or more steam turbines 18 to power the power grid 12 and/or the house load 14. A sensor 19 disposed within the house load 14 may detect the power demand of the house load 14. In certain embodiments, the power demand may govern operation of the gas turbines 16 and/or the steam turbines 18.

Electrical power from the gas turbines 16 may be directed through a turbine breaker 20 to the house load 14. The turbine breaker 20 may close or open to respectively connect or disconnect the gas turbine 16 from the house load 14 and the power grid 12. Additionally or alternatively, electrical power from the gas turbines 16 may be directed through a transformer 22 and a bus breaker 24 to a house bus 26. From the house bus 26, the electrical power may be directed through a grid breaker 28 to the power grid 12. The grid breaker 28 may close or open to respectively connect or disconnect the turbines 16, 18 from the power grid 12. As illustrated, each of the breakers 20, 24, 28, is closed, thereby enabling the turbines 16, 18 to supply electrical power both to the power grid 12 and to the house load 14 during normal operation. A "normal operation" may generally refer to the gas turbine 16 being connected to the power grid 12 through the breakers 20, 24, 28. Alternatively, an "electrical island mode" may generally refer to the gas turbine 16 being disconnected from the power grid 12. Thus, the breakers 20, 24, 28 may be selectively opened or closed to control the flow of electrical power within the electrical system 10, as will be discussed further below in FIG. 2.

The electrical system 10 may switch from normal mode to electrical island mode for a variety of reasons. For example, the power grid 12 may be down for maintenance, or the electrical power from the turbines 16, 18 may be unsuitable for the power grid 12. Once the power grid 12 is again operational, or the electrical power from the turbines 16, 18 is again suitable, the electrical system 10 may return to normal mode. Operation in electrical island mode may be desirable, as it enables the gas turbines 16 to maintain the power demand of the house load 14, even while disconnected from the power grid 12. In addition, the total power demand is reduced during electrical island mode, so the amount of power generated by the turbines 16, 18 may be reduced accordingly.

A reduction of power generation (e.g., load rejection) may be implemented in various ways. For example, a single gas turbine 16 may provide power to the house load 14, and the remaining turbines 16, 18 may be disconnected from the house load 14 (e.g., single unit island mode). Additionally or alternatively, a single turbine 16, 18 may be designated as a governor, and other turbines 16, 18 may generate power at the same frequency as the governor (e.g., multiple unit island mode). Further, multiple turbines 16, 18 may communicate with each other to generate power in desired amounts and frequencies (e.g., isochronous load sharing). Still further, the amount of fuel directed to the gas turbines 16 or the amount of steam directed to the steam turbines 18 may be throttled to decrease the power output of the turbines 16, 18.

Certain actions may be taken while operating in electrical island mode to enable a quick restart of the electrical system 10. For example, the steam turbines 18 may be slow-rolled at minimum speeds. Additionally or alternatively, the fuel to the gas turbines 16 may be throttled by a predetermined amount to maintain a combustion flame and reduce the likelihood of overtemperature of the gas turbines 16.

Figure 2:
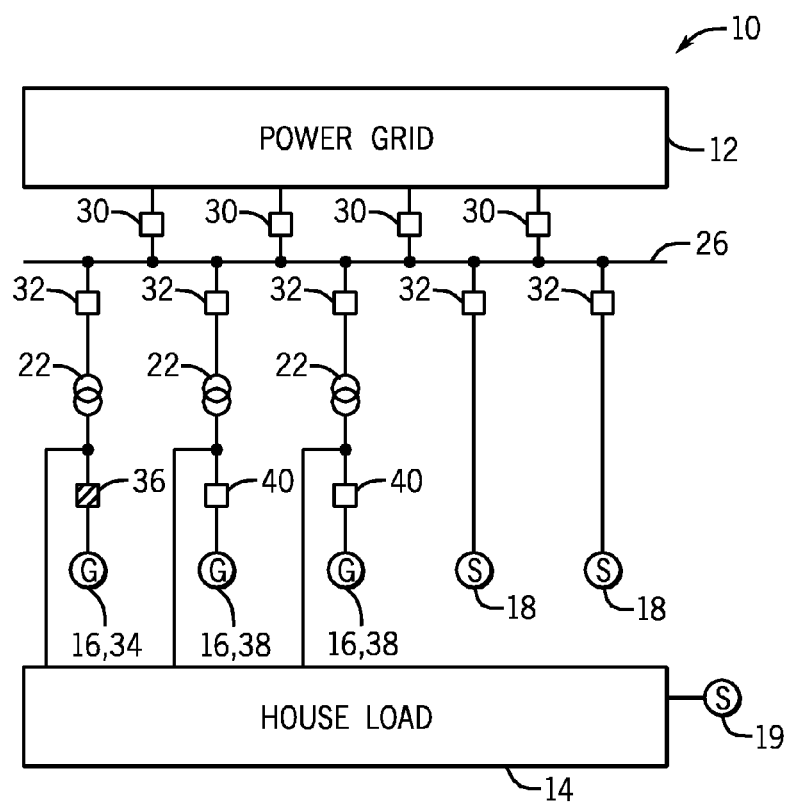
FIG. 2 is a schematic diagram of the electrical system of FIG. 1, illustrating the gas turbine engines disconnected from the power grid and operating in an electrical island mode, in accordance with an embodiment.

FIG. 2 illustrates an embodiment of the electrical system 10 with the gas turbines 16 operating in electrical island mode and disconnected from the power grid 12. As shown, open grid breakers 30 disconnect the power grid 12 from the house bus 26. In addition, open bus breakers 32 disconnect the house bus 26 from the turbines 16, 18. Operation of the gas turbines 16 may power the house load 14 or may enable a quick restart of the electrical system 10. For example, a gas turbine 34 is connected to, and provides power to, the house load 14 through a closed turbine breaker 36. Gas turbines 38 are disconnected from the house load 14 by open turbine breakers 40. The gas turbine 34 powers the house load 14, while the gas turbines 38 operate at conditions to maintain the combustion flame. In certain embodiments, the gas turbines 38 may operate at full speed no load (FSNL), or the gas turbines 36 may operate at their minimum speeds. The steam turbines 18 may also be operating at minimum speeds. In certain embodiments, the turbines 16, 18 may implement a single unit island mode, a multiple unit island mode, or isochronous load sharing, as described previously. In addition, the amount of fuel directed to the gas turbines 16 may be throttled to enable load rejection during electrical island mode.

Figure 3:
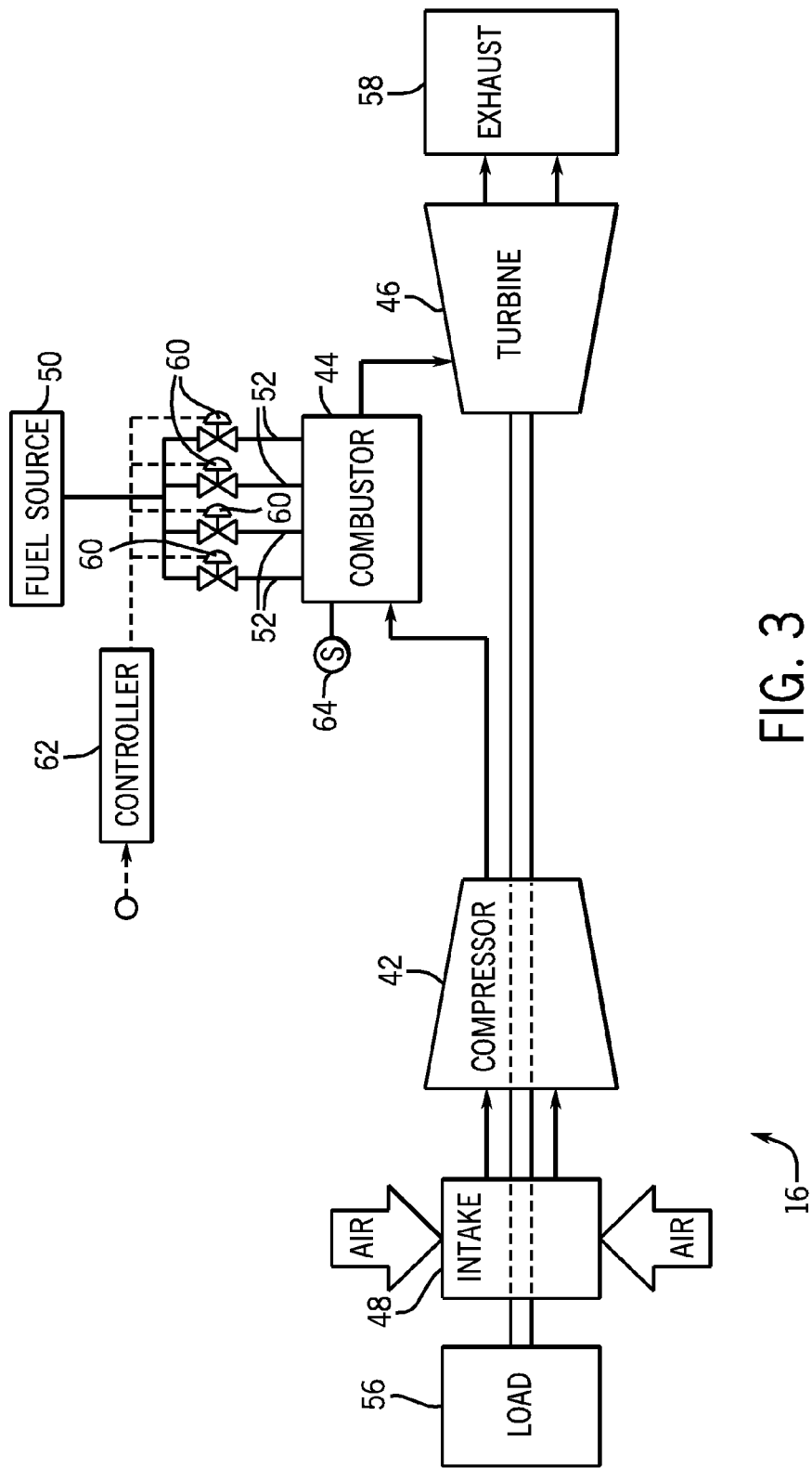
FIG. 3 is a schematic diagram of the gas turbine of FIG. 1, illustrating a controller to adjust a fuel supply, in accordance with an embodiment.

FIG. 3 is a block diagram of an embodiment of the gas turbine 16 that may throttle fuel to enable load rejection during electrical island mode, thereby increasing the operability of the gas turbine 16. The gas turbine 16 includes a compressor 42, a combustor 44, and a turbine 46. The compressor 42 receives air from an intake 48 and compresses the air for delivery to the combustor 44. The combustor 48 also receives fuel from a fuel source 50 through a plurality of fuel manifolds 52. The air and fuel are fed to the combustor 44 in a specified ratio suitable for combustion, emissions, fuel consumption, and/or power output. The air and fuel mix, and the mixture reacts within the combustor 44 to form combustion products. The hot combustion products are fed into the turbine 46, which forces blades of the turbine 46 to rotate, thereby driving a shaft 54 into rotation. As illustrated, the shaft 54 is also coupled to the compressor 42 and a load 56. Thus, the rotation of the shaft 54 may provide the energy for the compressor 42 to compress the air. In certain embodiments, the load 56 may be an electric generator that may provide electrical power to the house load 14 and/or the power grid 12. After energy from the combustion products has been extracted by the turbine 46, the combustion products exit the turbine 46 and are discharged to an exhaust outlet 58.

During normal operation, the gas turbine 16 may generally produce a rated power for which the gas turbine 16 is designed. However, as noted previously, the gas turbine 16 may produce less power during electrical island mode, thereby rejecting a portion of the rated power. In certain embodiments, the portion of the rated power rejected by the gas turbine 16 may be greater than approximately 5 percent, 10 percent, or 15 percent of the rated load. That is, the gas turbine 16 may reject up to approximately 85 percent, 90 percent, or 95 percent of the rated load.

As discussed above, in order to reject a portion of the rated power in electrical island mode, the amount of fuel delivered to the gas turbine 16 may be throttled. To this end, a fuel control valve 60 is disposed within each fuel manifold 52. In certain embodiments, it may be desirable to vary the amount of fuel delivered through each fuel manifold 52 for improving combustion, emissions, fuel consumption, and/or power output. Thus, the fuel control valves 60 may independently throttle the fuel to each fuel manifold 52. As illustrated, the gas turbine 16 includes four fuel manifolds 52. However, the number of fuel manifolds 52 may be implementation-specific. In addition, depending on the operation of the gas turbine 16, the combustor 44 may receive fuel from only certain fuel manifolds 52. For example, two fuel manifolds 52 may supply fuel, while the remaining fuel manifolds 52 do not supply any fuel. Accordingly, in certain embodiments, the combustor 44 may receive fuel from 1, 2, 3, 4, 5, or more fuel manifolds 52.

In order to throttle the control valves 60 in a controlled manner, the gas turbine 16 includes a controller 62, which is communicatively coupled to the control valves 60. Upon receiving a signal from the electrical system 10 to initiate load rejection, the controller 62 may throttle the fuel control valves 60 in accordance with a fuel schedule associated with electrical island mode. In order to maintain the combustion flame within the combustor 44, it may be desirable to gradually adjust the fuel control valves 60. Accordingly, the controller 62 may adjust the fuel control valves 60 over a preset period of time (e.g., an adjustment period). The adjustment period may be between approximately 5 to 500 seconds, 10 to 100 seconds, or 30 to 70 seconds. In certain embodiments, the adjustment period may be dynamic. For example, a sensor 64 (e.g., flame sensor) disposed in the combustor 44 may sense the combustion flame, and the controller 62 may adjust the fuel control valves 60 for a period of time based on a measurement of the flame sensor. In certain embodiments, the sensor 64 may detect various conditions, such as an ambient temperature, an ambient pressure, a flame temperature, a flame color, or any combination thereof.

In certain embodiments, the air intake to the combustor 44 may be approximately constant while the controller 62 adjusts the fuel control valves 60. Accordingly, additional actions may be taken to maintain the combustion flame within the combustor 44. For example, if fuel flow through one of the fuel manifolds 52 is approximately zero during the adjustment period, the controller 62 may adjust the fuel control valves 60 for an additional period of time (e.g., a second adjustment period). The second adjustment period may enable a more even distribution of fuel within the fuel manifold 52. In certain embodiments, the second adjustment period may be between approximately 3 to 30 seconds, 4 to 20, or 5 to 10 seconds. The operation of the controller 62 is described further below with respect to FIG. 4.

Figure 4:
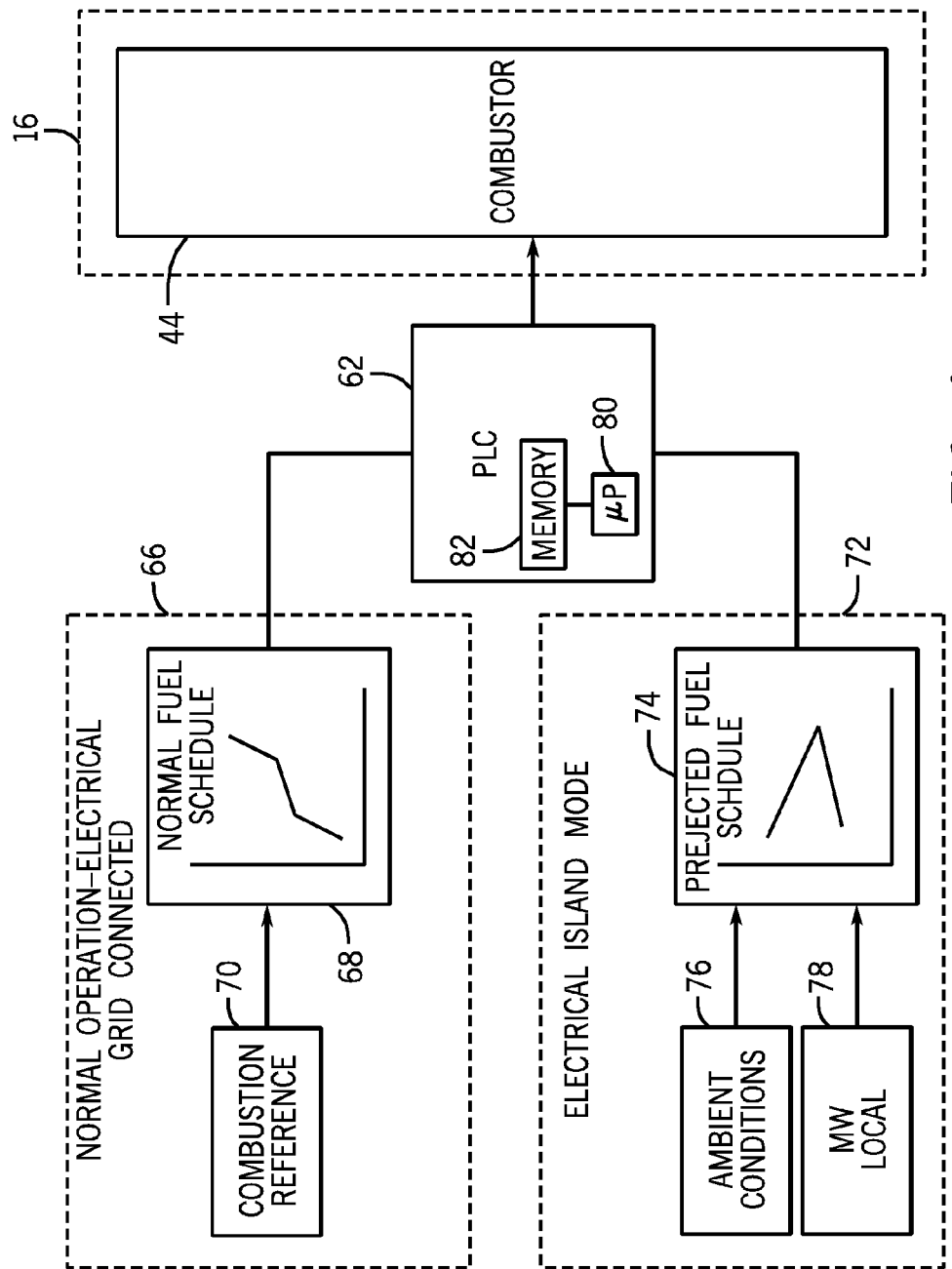
FIG. 4 is a schematic diagram of the controller of FIG. 3, illustrating a selection between a plurality fuel schedules to govern operation of the gas turbine, in accordance with an embodiment.

FIG. 4 illustrates an operation of the controller 62 that enables load rejection for the gas turbine 16 during electrical island operation, thereby increasing the operability of the gas turbine 16. As shown, normal mode operation includes normal operation guidelines 66. The normal operation guidelines 66 include a normal fuel schedule 68 that is based on a combustion reference 70. The normal fuel schedule 68 may determine the fuel distribution among the fuel manifolds 52 based on the combustion reference. In certain embodiments, the combustion reference 70 may include a variety of operating parameters of the combustor 44, such as an operating temperature, operating pressure, and the like.

In addition, electrical island mode includes island operation guidelines 72. The island operation guidelines 72 include an island mode fuel schedule 74 that is based on ambient conditions 76 and a local demand 78 of the house load 14. The ambient conditions 76 may be detected by the sensor 64 of FIG. 3. Similarly, the local demand 78 may be detected by the sensor 19 of FIG. 1. The island mode fuel schedule 74 may determine the fuel distribution among the fuel manifolds 52 based on the ambient conditions 76, and the local demand 78. In certain embodiments, the ambient conditions may include an ambient temperature, an ambient pressure, or a combination thereof. As illustrated, the controller 62 may select between the guidelines 66, 72 and their respective fuel schedules 68, 74 to govern operation of the combustor 44 and the gas turbine 16. For example, the controller may select the normal fuel schedule 68 to govern operation during startup of the gas turbine 16. Upon receiving a signal from the electrical system 10 to initiate load rejection, the controller 62 may subsequently select the island mode fuel schedule 74 to govern operation of the gas turbine 16.

The controller 62 includes one or more processors 80 and/or other data processing circuitry, such as memory 82, to execute instructions to enable load rejection for the gas turbine 16. These instructions may be encoded in software programs that may be executed by the one or more processors 80. For example, the processor 80 may determine the distribution of fuel between the fuel manifolds 52 based on the fuel schedules 68, 74. Further, the instructions may be stored in a tangible, non-transitory, computer-readable medium, such as the memory 82. The memory 82 may include, for example, random-access memory, read-only memory, rewritable memory, hard drive(s), and/or optical discs. In certain embodiments, the fuel schedules 68, 74 may be encoded and stored within the memory 82 to be later accessed by the one or more processors 80. An example of the island mode fuel schedule 74 is discussed below in FIG. 5.

Figure 5:
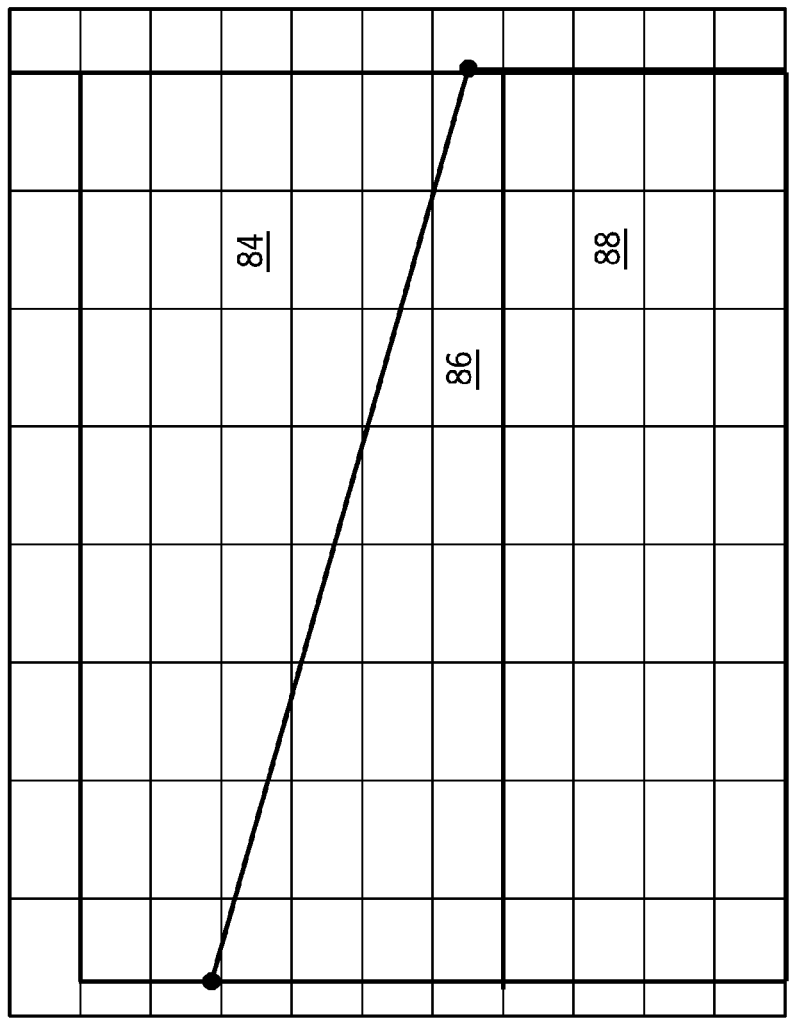
FIG. 5 is a graphical illustration of the fuel schedule of FIG. 4, illustrating multiple operating modes based on an ambient temperature and an output of the gas turbine engine, in accordance with an embodiment.

FIG. 5 is a graphical illustration of an embodiment of the island mode fuel schedule 74 to enable load rejection for the gas turbine 16, thereby increasing the operability of the gas turbine 16. As shown, the island mode fuel schedule 74 includes three operating modes 84, 86, 88 corresponding to different regions of the island mode fuel schedule 74. Each operating mode includes a specific fuel distribution among the fuel manifolds 52. For example, the operating mode 88 may include an approximately equal distribution of fuel among the fuel manifolds 52, whereas the operating mode 84 may include an unequal distribution of fuel. The controller may implement these specific fuel distributions by throttling the fuel control valves 60.

The operating modes 84, 86, 88 may be designed to accommodate an acceptable level of combustion, emissions, fuel consumption, and/or power output based on the ambient condition 76 (e.g., ambient temperature 90). As shown, the operating modes 84, 86, 88 may be uniquely defined based on the ambient temperature 90 and the desired output of the gas turbine (e.g., the local demand 78 of the house load 14). In certain embodiments, other variables, such as ambient pressure, may be considered to define the operating modes. Alternatively, the operating modes 84, 86, 88 may be based on the ambient temperature 90 and the local demand 78 exclusively. The controller 62 may automatically select among the operating modes 84, 86, 88 to govern operation of the gas turbine 16. For example, the controller 62 may select the operating mode 88 at low local demand 78, regardless of the ambient temperature 90. At higher a local demand 78 and higher ambient temperatures 90, the gas turbine 16 may operate in the mode 84.

The number of operating modes within the island mode fuel schedule 74 may be implementation-specific. For example, the island mode fuel schedule 74 may have 1, 2, 3, 4, 5, or more unique operating modes and associated fuel distributions. In addition, the distribution of fuel among the fuel manifolds 52 in each operating mode 84, 86, 88 may be predetermined based on various factors, such as the size and type of the gas turbine 16 (e.g., a dry, low nitric oxide turbine), the type of fuel, the amount of air intake, and the like. An example of the operating mode 84 and its associated fuel distribution is described below in FIG. 6.

Figure 6:
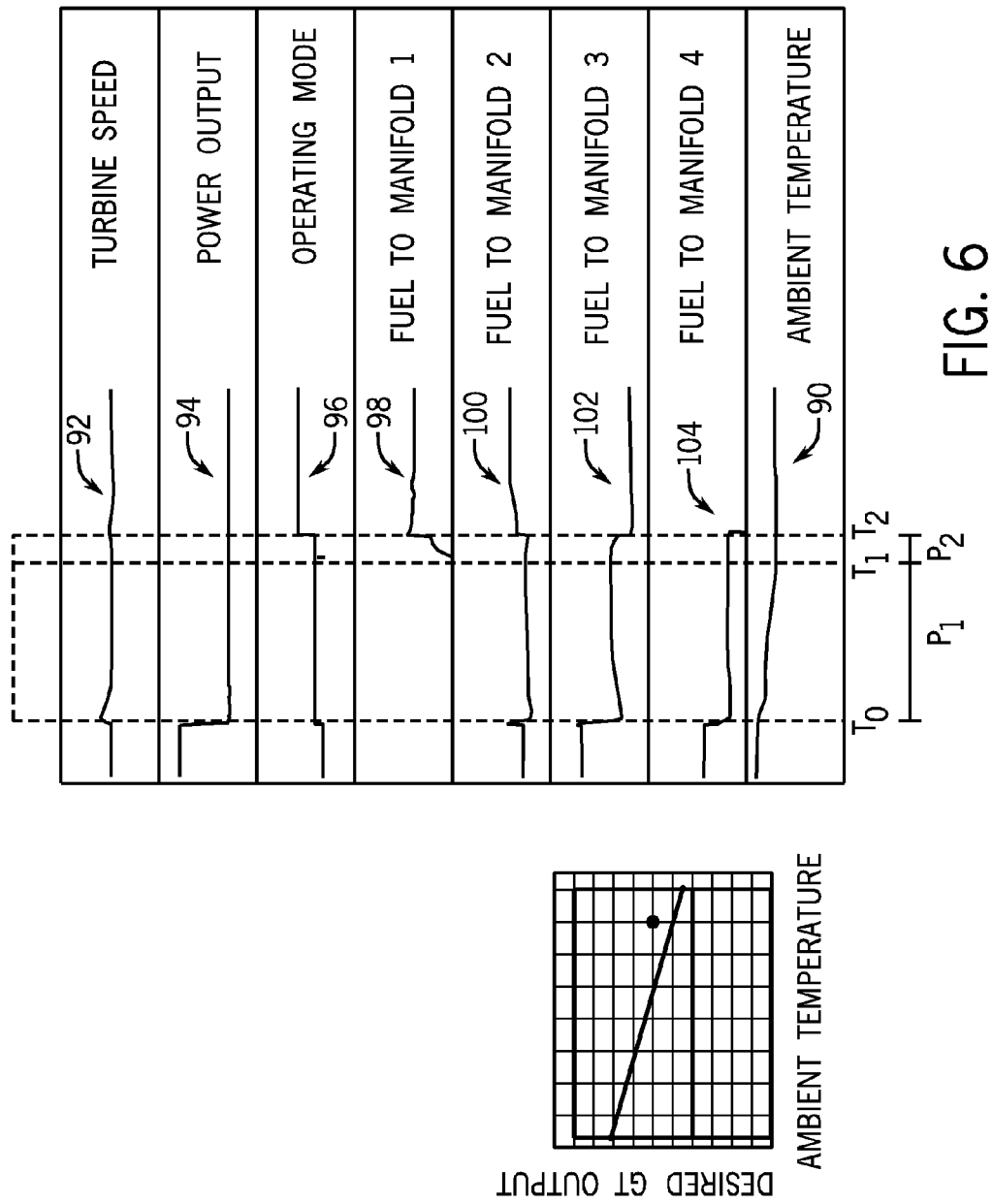
FIG. 6 is a graphical illustration of the operating mode of FIG. 5, illustrating the change of operating variables over time, in accordance with an embodiment.

FIG. 6 is a graphical illustration showing process variables of the gas turbine 16, as the gas turbine 16 changes from normal mode operation to electrical island mode operation (e.g., operating mode 84). The illustrated process variables include a turbine speed 92, a power output 94, an operating mode 96, fuel 98 to a first fuel manifold, fuel 100 to a second fuel manifold, fuel 102 to a third fuel manifold, fuel 104 to a fourth fuel manifold, and the ambient temperature 90. Prior to time $T_0$, the gas turbine 16 is operating in accordance with the normal operating guidelines 66. However, at time $T_0$, the controller 62 may receive a signal to initiation load rejection. Further, the controller 62 may select the operating mode 84 from the island mode fuel schedule 74, as discussed previously. During the adjustment period $P_1$ and until time $T_1$, the controller 62 gradually adjusts the fuel control valves 60 to decrease the power output 94, thereby rejecting a portion of the rated load. The adjustment period $P_1$ may be between approximately 5 to 500 seconds, 10 to 100 seconds, or 30 to 70 seconds, as noted earlier.

As illustrated, the turbine speed 92 increases slightly after $T_0$ and then decreases back to its previous level. The power output 94 decreases quickly at $T_0$ as an indication of load rejection by the gas turbine 16. Likewise, the operating mode 96 changes stepwise to indicate a change from normal operation to electrical island mode. The fuel 98, 100, 102, 104 to the respective fuel manifolds are adjusted in accordance with the operating mode 84. Notably, the fuel 98 to the first manifold is approximately zero for the period $P_1$. As a result, the controller 62 may continue to adjust the fuel 98, 100, 102, 104 for a second adjustment period $P_2$. As discussed above, the second adjustment period $P_2$ may enable a more even distribution of fuel within the fuel manifolds 52. In addition, the second adjustment period $P_2$ may be between approximately 3 to 30 seconds, 4 to 20, or 5 to 10 seconds. After time $T_2$, the gas turbine may continue to operate in electrical island mode, and the process variables may continue to line out.

The aforementioned changes in process variables are given by way of example, and are not intended to be limiting. Indeed, other configurations, including different fuel distributions, turbine speeds, power outputs, and ambient temperatures, may be envisioned in accordance with implementation-specific embodiments.

Figure 7:
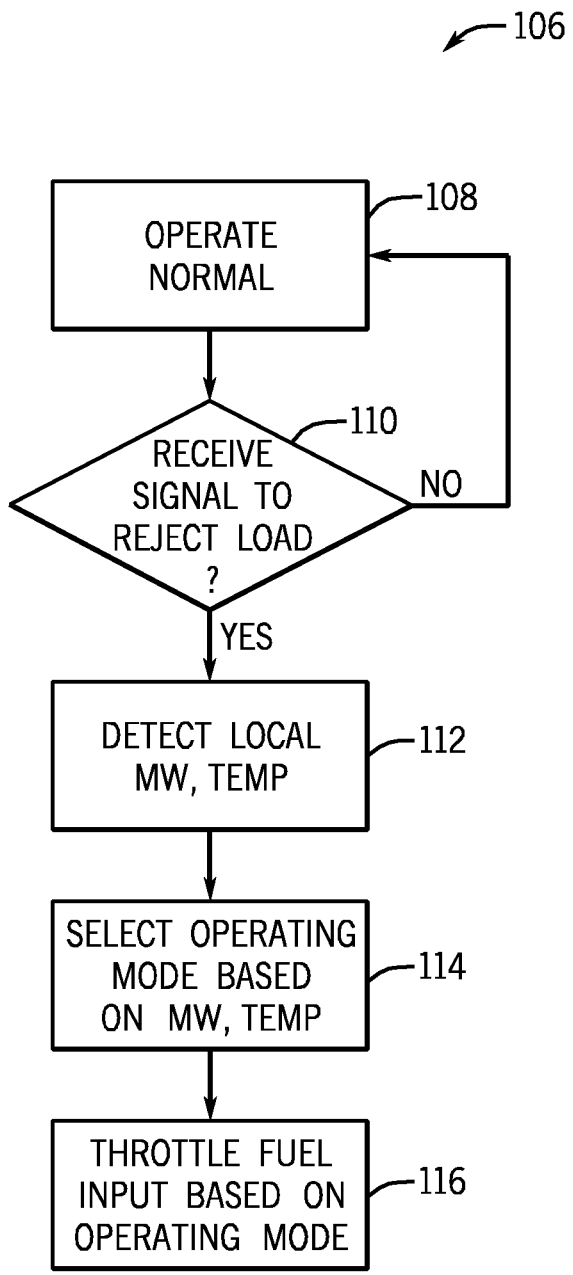
FIG. 7 is a flowchart of a method to enable load rejection of gas turbine engines, in accordance with an embodiment.

FIG. 7 is an example of a method 106 to enable load rejection for the gas turbine 16, thereby increasing the operability of the gas turbine 16. The gas turbine 16 may operate (block 108) in the normal mode while connected to the power grid 12. Thereafter, the controller 62 may receive (block 110) a signal to initiate load rejection from the electrical system 10. If the controller 62 does not receive (block 110) the signal, the gas turbine may continue to operate (block 108) in the normal mode. However, after receiving (block 110) the signal, the sensors 19, 64 may detect (block 112) the local demand 78 and the ambient temperature 90, respectively. The controller 62 may select (block 114) an operating mode of the island mode fuel schedule 74 based on the local demand 78 and the ambient temperature 90. The controller 62 may then throttle (block 116) the fuel control valves 60 based on the operating mode to enable load rejection for the gas turbine 16.

Technical effects of the disclosed embodiments enable a gas turbine to maintain a house load while disconnected from an electrical grid. In particular, the gas turbine may reject a portion of the rated load by gradually adjusting fuel input to the combustor in accordance with an operating mode of a fuel schedule. The operating mode may be selected based on an ambient temperature and a desired power output of the gas turbine. The gradual adjustment of fuel maintains the combustion flame, while simultaneously reducing the magnitude or likelihood of overtemperature of the gas turbine. Accordingly, the operability of the gas turbine is increased by enabling the gas turbine to decrease its power output in response to a decrease in the downstream power demand.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine system, comprising:
a compressor configured to compress air;
a fuel source configured to supply fuel to a plurality of fuel manifolds;
a combustor configured to receive the air from the compressor, to receive the fuel from the plurality of fuel manifolds, and to combust the air and the fuel into combustion products;
a turbine configured to extract work from the combustion products;
a plurality of fuel control valves, each corresponding to a respective one of the plurality of fuel manifolds and configured to throttle the fuel to the combustor when the gas turbine system is operating in an electrical island mode; and
a controller comprising a processor and an article of manufacture that includes one or more tangible, machine-readable media at least collectively comprising instructions executable by the processor, the instructions comprising instructions to:
receive a signal to initiate load rejection by the gas turbine system;
detect an ambient condition of the gas turbine system and a power demand of a local load supplied at least partially by the gas turbine system;
select a fuel schedule of a plurality of fuel schedules based on the signal;
select a fuel distribution operating mode of a plurality of stored fuel distribution operating modes of the selected fuel schedule based on the ambient condition and the power demand, wherein each of the plurality of fuel distribution operating modes comprises a unique fuel distribution for the plurality of fuel manifolds; and
throttle the fuel to the plurality of fuel control valves according to the selected fuel distribution operating mode.

2. The gas turbine system of claim 1, wherein the turbine is configured to produce a rated power during normal operation and the gas turbine system is configured to reject a portion of the rated power by throttling a first fuel control valve of the plurality of fuel control valves for a first time period during the electrical island mode.

3. The gas turbine system of claim 2, wherein the portion of the rated power rejected by the gas turbine system is greater than 10% of the rated load.

4. The gas turbine system of claim 2, wherein the first time period is between approximately 10 seconds and 100 seconds.

5. The gas turbine system of claim 2, wherein the gas turbine system is configured to throttle the first fuel control valve for a second time period after the first time period when a fuel flow through the first fuel control valve is approximately zero for a portion of the first time period.

6. The gas turbine system of claim 1, comprising:
a plurality of breakers configured to selectively isolate the gas turbine system from a power grid, a local load, or both, wherein the gas turbine system is configured to be coupled to the power grid through the plurality of breakers during normal operation and the gas turbine system is configured to be isolated from the power grid during the electrical island mode.

7. The gas turbine system of claim 1, wherein the ambient condition comprises an ambient temperature, an ambient pressure, or a combination thereof.

8. A system comprising:
a gas turbine engine having a combustor configured to combust a mixture of fuel and air; and
a controller configured to select an operating fuel schedule from a plurality of fuel schedules and to adjust the fuel and air mixture to the combustor based on the operating fuel schedule, wherein the plurality of fuel schedules comprises a first fuel schedule and a second fuel schedule, wherein the controller is configured to select the first fuel schedule during a normal operation in which the gas turbine engine is producing a rated load and to select the second fuel schedule during an electrical island operation in which the gas turbine engine is rejecting a portion of the rated load, wherein the second fuel schedule comprises a plurality of fuel distribution operating modes, and wherein the controller is configured to select a fuel distribution operating mode from the plurality of fuel distribution operating modes based at least in part on an ambient temperature and a power demand of a local load.

9. The system of claim 8, wherein the controller is configured to
throttle a fuel flow to the gas turbine engine according to the selected fuel distribution operating mode of the second fuel schedule.

10. The system of claim 8, wherein the second fuel schedule is based at least in part on a power demand of a local load and an ambient condition.

11. The system of claim 10, wherein the ambient condition comprises an ambient temperature, an ambient pressure, or a combination thereof.

12. An article of manufacture comprising:
one or more tangible, machine-readable media at least collectively comprising instructions executable by a processor, the instructions comprising instructions to:
receive a signal to initiate load rejection by a gas turbine engine;
detect an ambient condition of the gas turbine engine and a power demand of a local load supplied at least partially by the gas turbine engine;
select a fuel schedule of a plurality of fuel schedules based on the signal;
select a fuel distribution operating mode of a plurality of stored fuel distribution operating modes of the selected fuel schedule based on the ambient condition and the power demand, wherein each of the plurality of fuel distribution operating modes comprises a unique fuel distribution for a plurality of fuel manifolds of the gas turbine engine; and
throttle a fuel flow to the plurality of fuel manifolds according to the selected fuel distribution operating mode of the selected fuel schedule.

13. The article of manufacture of claim 12, wherein the ambient condition comprises an ambient temperature, an ambient pressure, or a combination thereof at the gas turbine engine.

14. The article of manufacture of claim 12, wherein the instructions to throttle the fuel flow comprise instructions to adjust a fuel control valve to throttle the fuel flow for a first time period.

15. The article of manufacture of claim 14, wherein the instructions to throttle the fuel flow comprise instructions to adjust the fuel control valve to throttle the fuel flow for a second time period when the fuel flow is approximately zero for a portion of the first time period.

16. The article of manufacture of claim 15, wherein the first time period is longer than the second time period.

17. The article of manufacture of claim 12, wherein the instructions to throttle the fuel flow comprise instructions to adjust a plurality of fuel control valves to selectively distribute the fuel flow through the plurality of fuel manifolds based on the operating mode.

18. The article of manufacture of claim 12, wherein the instructions to throttle the fuel flow are configured to cause the gas turbine engine reject a portion of a rated load of the gas turbine engine.

19. The article of manufacture of claim 18, wherein the portion of the rated power rejected by the gas turbine engine is greater than 10% of the rated load.

20. The article of manufacture of claim 12, wherein the article of manufacture comprises a memory device of a controller that comprises the processor, wherein the controller is coupled to the gas turbine and configured to control the gas turbine according to the instructions of the article of manufacture.

* * * * *